US009576259B2

(12) United States Patent
Li et al.

(10) Patent No.: US 9,576,259 B2
(45) **Date of Patent: *Feb. 21, 2017**

(54) SYSTEMS, METHODS AND APPARATUS FOR OPTIMIZING FUEL MIX, FUEL ALLOCATION AND SCHEDULING OF GENERATOR RESOURCES

(71) Applicant: Siemens Industry, Inc., Alpharetta, GA (US)

(72) Inventors: Tao Li, Plymouth, MN (US); Ashmin Mansingh, Maple Grove, MN (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 330 days.

This patent is subject to a terminal disclaimer.

(21) Appl. No.: 14/331,316

(22) Filed: Jul. 15, 2014

(65) Prior Publication Data

US 2015/0051938 A1 Feb. 19, 2015

Related U.S. Application Data

(60) Provisional application No. 61/865,156, filed on Aug. 13, 2013.

(51) Int. Cl.

*G06Q 10/06* (2012.01)
*G05B 13/02* (2006.01)

(52) U.S. Cl.

CPC ..... *G06Q 10/06314* (2013.01); *G05B 13/0205* (2013.01); *Y04S 10/54* (2013.01); *Y04S 10/545* (2013.01)

(58) Field of Classification Search

CPC .. G05B 13/041; Y02E 20/16; G06Q 10/06314

(Continued)

(56) References Cited

U.S. PATENT DOCUMENTS 6,522,994 B1 2/2003 Lang
7,146,353 B2 12/2006 Santos (Continued)

FOREIGN PATENT DOCUMENTS

EP 1418477 A1 5/2004

OTHER PUBLICATIONS

D. Zhai et al., Fuel Constrained Unit Commitment With Fuel Mixing and Allocation, 2001, IEEE Power Industry Computer Applications 2001, pp. 11-16.*

(Continued)

*Primary Examiner* — Anita Coupe
*Assistant Examiner* — Shelby Turner

(57) ABSTRACT

Embodiments of the invention provide systems, methods, and apparatus for receiving input information including at least one of generator parameters, energy output requirements, fuel cost, fuel availability, and a maintenance schedule; creating a resource model based on the input information wherein creating the resource model includes linearizing a quadratic objective function and linearizing a quadratic gas constraints function; generating an optimized operating schedule, fuel mix, and allocation plan from the resource model based on the input information; and controlling the generator resources to optimally meet energy output requirements using the operating schedule fuel mix, and allocation plan. Numerous other aspects are provided.

11 Claims, 3 Drawing Sheets

204

DEFINE A QUADRATIC OBJECTIVE FUNCTION AND A QUADRATIC GAS CONSTRAINTS FUNCTION — 302

LINEARIZE THE QUADRATIC OBJECTIVE FUNCTION AND THE QUADRATIC GAS CONSTRAINTS FUNCTION — 304

GENERATE AN OPTIMIZED RESOURCE SCHEDULE USING A MIXED-INTEGER LINEAR PROGRAMMING (MILP) MODEL BASED ON THE LINEARIZED QUADRATIC OBJECTIVE FUNCTION AND THE LINEARIZED QUADRATIC GAS CONSTRAINTS FUNCTION — 306

FIX THE FUEL MIX RATIO AND THE BINARY DECISION VARIABLES BASED ON VALUES OBTAINED FROM THE MILP MODEL — 308

DETERMINE A UNIT COMMITMENT SOLUTION BASED ON QUADRATIC CONSTRAINT PROGRAMMING WITH THE QUADRATIC OBJECTIVE FUNCTION AND THE QUADRATIC GAS CONSTRAINTS FUNCTION — 310

DETERMINE AN OPTIMAL GENERATION DISPATCH AND FUEL ALLOCATION PLAN BASED ON THE UNIT COMMITMENT SOLUTION — 312

(58) Field of Classification Search
USPC ................................................ 705/7.41, 7.42
See application file for complete search history.

(56) References Cited

U.S. PATENT DOCUMENTS

| | | | | |
|---|---|---|---|---|
| 8,433,450 | B2 * | 4/2013 | Francino | F01K 9/003 700/290 |
| 2012/0310608 | A1 | 12/2012 | Zhang | |
| 2013/0158848 | A1 | 6/2013 | Norton | |
| 2015/0286611 | A1 * | 10/2015 | Moll | G06Q 10/04 708/102 |

OTHER PUBLICATIONS

Tao Li and Mohammad Shahidehpour, Price-Based Unit Commitment: A Case of Lagrangian Relaxation Versus Mixed Integer Programming, Nov. 2005, IEEE Transactions on Power Systems, vol. 20, No. 4, pp. 2015-2025.*

Bo Lu and Mohammad Shahidehpour, Unit Commitment with Flexible Generating Units, May 2005, IEEE Transactions on Power Systems, vol. 20, No. 2, pp. 1022-1034.*

Quadratic programming—Wikipedia, Nov. 10, 2016 Accessed at https://en.wikipedia.org/wiki/Quadratic_programming on Nov. 10, 2016.*

Quadratically constrained quadratic program—Wikipedia, Sep. 9, 2016. Accessed at https://en.wikipedia.org/wiki/Quadratically_constrained_quadratic_program on Nov. 10, 2016.*

Fu et al. Security-Constrained Unit Commitment with AC Constraints*, IEEE Transactions on Power Systems, vol. 20, No. 3, Aug. 2005.*

PCT International Search Report mailed Jan. 22, 2015 corresponding to PCT International Application No. PCT/US2014/050494 filed Aug. 11, 2014 (2 pages).

* cited by examiner

SYSTEMS, METHODS AND APPARATUS FOR OPTIMIZING FUEL MIX, FUEL ALLOCATION AND SCHEDULING OF GENERATOR RESOURCES

RELATED APPLICATIONS

The present application claims priority to U.S. Provisional Application No. 61/865,156 titled "Fuel Mix Optimization and Optimal Fuel Allocation and in Generating Resources scheduling for Power Systems" filed Aug. 13, 2013 which is incorporated herein by reference for all purposes.

FIELD

The present invention relates to scheduling the operation of resources such as power generators, and more specifically to determining an optimal fuel mix, fuel allocation, and schedule for operating generator resources.

BACKGROUND

Optimizing the operation of power generators, particularly those that can run on different fuels, to minimize cost and maximize efficiency is a complex problem. Conventional methods used typically require significant manual calculations that require detailed technical understanding. Thus, what is needed are automated systems, methods, and apparatus for generating an optimized fuel mix, fuel allocation, and resource operating schedule based on accurate models of such generator systems.

SUMMARY

In some embodiments, a method of operating generator resources is provided. The method includes receiving input information including at least one of generator parameters, energy output requirements, fuel cost, fuel availability, and a maintenance schedule; creating a resource model based on the input information wherein creating the resource model includes linearizing a quadratic objective function and linearizing a quadratic gas constraints function; generating an optimized operating schedule, fuel mix, and allocation plan from the resource model based on the input information; and controlling the generator resources to optimally meet energy output requirements using the operating schedule fuel mix, and allocation plan.

In other embodiments, a system for operating generator resources is provided. The system includes a plurality of input information sources; a modeling system including a resource model operable to generate an operating schedule, fuel mix and allocation plan, the modeling system couplable to the input information sources to receive input information; a system controller operative to execute the operating schedule and fuel allocation plan, and coupled to the modeling system; and a plurality of generator resources coupled to and controlled by the system controller.

In still other embodiments, an alternative system for operating generator resources is provided. The system includes a processor; and a memory coupled to the processor and storing processor executable instructions to: receive input information including at least one of generator parameters, energy output requirements, fuel cost, fuel availability, and a maintenance schedule; create a resource model based on the input information wherein creating the resource model includes linearizing a quadratic objective function and linearizing a quadratic gas constraints function; generate an optimized operating schedule, fuel mix, and allocation plan from the resource model based on the input information; and control the generator resources to optimally meet energy output requirements using the operating schedule fuel mix, and allocation plan.

Numerous other aspects are provided in accordance with these and other aspects of the invention. Other features and aspects of the present invention will become more fully apparent from the following detailed description, the appended claims and the accompanying drawings.

DETAILED DESCRIPTION

Figure 1:
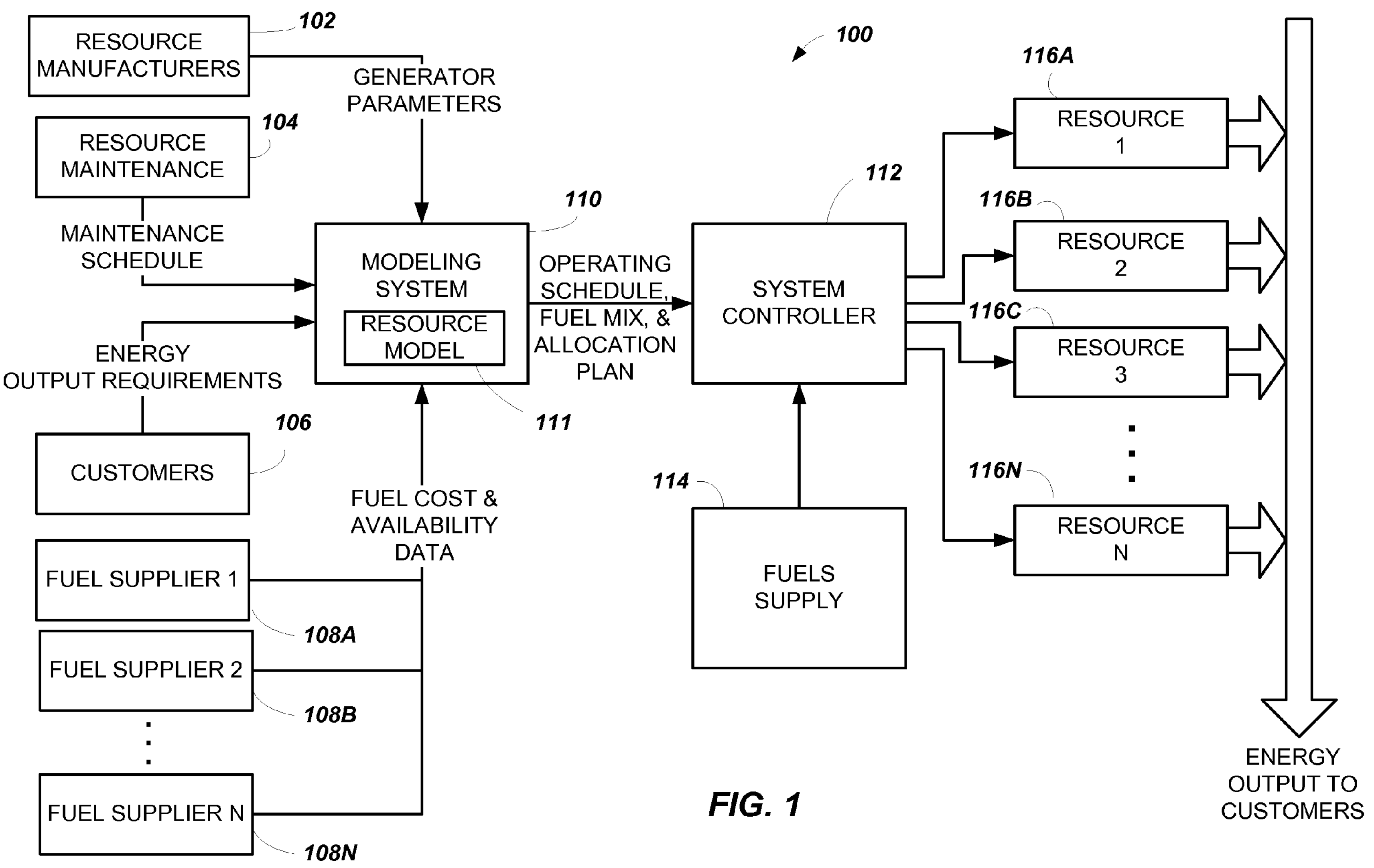
FIG. 1 is a schematic depiction of an example system according to embodiments of the present invention.

Embodiments of the present invention provide systems, apparatus and methods for creating an optimized operating schedule, fuel mix, and fuel allocation plan for using resources such as, for example, generators. The modeling of resources in a security constrained unit commitment environment is used by independent system operators and energy generation companies for market clearing and making economic commitments. In addition, such models are used for the dispatch of generators subject to constraints on the power grid. Embodiments of the present invention can be applied to solving resource scheduling, fuel mix optimization (e.g., between gas and oil), and optimizing fuel allocation in both electricity markets and traditional integrated power utilities.

Embodiments of the present invention provide methods for modeling operation of power generators so that the most cost effective operating schedule, fuel selection, and allocation can be selected. In other words, a mixed-integer linear programming (MILP) model is provided to optimally schedule dual-fuel burning generator resources with an optimal fuel mix ratio to minimize total generating cost considering various fuel supply (e.g., natural gas network) and generating resource physical constraints. In some embodiments, the model can be used by integrated power utilities or Independent Power System Operators (ISOs) in energy markets for optimal scheduling and operation of generating units.

Conventionally the fuel mix optimization problem is solved by the Lagrangian relaxation (LR) method. However the LR method suffers from a number of disadvantages. The LR method does not provide global optimality and lacks a direct measure of the optimality of a solution. Further, it is difficult to consider a large number of constraints (e.g., transmission constraints) using the LR method. The LR method is also problematic due to the difficulty of adding new constraints and maintenance.

In contrast, the MILP method of embodiments of the present invention can guarantee a solution that is globally optimal or one within an acceptable tolerance. The relative gap in MILP represents the absolute relative distance between the best integer solution and the best linear programming (LP) solution. The best LP solution is the solution of the LP relaxation of the corresponding MILP problem by relaxing integer variables as continuous variables. Accordingly, the MILP method can guarantee that the best integer solution is within the corresponding MILP gap of the globally optimal solution. Because of the nonconvexity of the unit commitment problem, the LR solution is only near optimal. Heuristics are often required to find a feasible solution. The MILP approach can model constraints and cost functions more accurately and easily. Adding constraints in MILP does not require modifications to the solution algorithm as is required in the LR method.

Embodiments of the present invention solve the fuel mix optimization problem using a combination MILP and quadratic constrain programming (QCP) method. Some embodiments involve a two-step process. First, a quadratic objective function and a quadratic gas constraints function are linearized so that the optimal resource scheduling problem can be solved using a MILP solver. The second step involves optimizing the same optimization problem by fixing the fuel mix ratio and the binary decision variables (e.g., including unit commitment decisions) using the values obtained from the first MILP problem. Using quadratic constraint programming with the quadratic objective function without linearization and the quadratic gas constraints function (e.g., fuel constraints) without linearization are used to solve the unit commitment problem to determine the optimal generation dispatch and fuel allocation.

As will be described in detail below, the fuel mix optimization problem has a product term in the objective function which makes a very difficult to solve non-convex problem. The fuel mix ratio could be discretized to certain values such as (0, 0.1, 0.2, 0.3, 0.4, . . . , 1) and the optimization problem can be formulated to select which value would be optimal. However, this approach includes disadvantages. Specifically, the fuel mix ratio is only part of the possible solution space and optimization error is introduced. Also, a large number of possible discrete fuel ratio values would make the optimization problem very difficult to solve. For instance, if the mix ratio is discretized into 100 values (i.e., 1% approximation error), then 100 binary variables need to be introduced which could significantly impact the performance of the unit scheduling optimization system. Instead, in embodiments of the present invention, the fuel mixture ratio is a continuous variable and can take any real value between 0 and 1.

Turning now to FIG. 1, a schematic block diagram of an embodiment of a system 100 is provided. The system 100 includes a plurality of data sources including resource (e.g., generator) manufacturers 102, resource maintenance requirements 104, customers 106, and fuel suppliers 108A-108N. Each data source provides information to the modeling system 110 which includes a resource model 111 representing the resources as described herein. For example, the resource (e.g., generator) manufacturers 102 provide generator performance parameters to the model 111; the resource maintenance requirements 104 provide a maintenance schedule to the model 111; the customers 106 provide energy requirements to the model 111; and the fuel suppliers 108A-108N provide fuel cost and availability data to the model 111.

The model 111 is used by the modeling system 110 to create an operating schedule, fuel mix, and allocation plan which is provided to a system controller 112. The system controller 112 is operably coupled to the fuels supply 114 and to the resources 116A-116N. Thus, the system controller 112 is operative to use the operating schedule, fuel mix, and allocation plan from the modeling system 110, to select the appropriate fuel and amount for each resource 116A-116N and to operate the resources 116A-116N to output electricity to customers (i.e., to optimally meet the customer energy requirements).

The fuel cost and availability data is based on, for example, the natural gas network. This fuel supply network is modeled by various fuel consumption constraints on gas pipelines, areas, power plants, and generating units.

Gas Constraints

Unit gas consumption balance:

$$UGCB:\ Q_{i,t} = \sum_{l \in Pipeline(i)} Q_{i,l,t} \qquad \forall\ i, t$$

Where $Q_{i,t}$ is the gas consumption of resource i in time step t l is the pipeline index $Q_{i,l,t}$ is the gas consumption of resource i from pipeline l in time step t $Pipeline(i)$ set of pipelines resource i is connected Pipeline gas consumption balance:

$$PGCB:\ Q_{l,t} = \sum_{i \in Pipeline(l)} Q_{i,l,t}\ \forall\ l, t$$

Where $Q_{l,t}$ is the gas consumption of pipeline l in time step t $Pipeline(l)$ set of resources that are connected to pipeline l Pipeline gas contract balance:

$$GCB:\ Q_{l,t} = \sum_{k \in Pipeline(l)} Q_{k,t}\ \forall\ l, t$$

Where $Q_{k,t}$ is the gas consumption of pipeline l from gas contract k in time step t Pipeline hourly limit:

$$\text{PHL}: Q_{l,t}^{min} \le Q_{l,t} - s_{l,t}^{+} + s_{l,t}^{-} \le Q_{l,t}^{max}\ \forall l,t$$

Where $Q_{l,t}^{max}/Q_{l,t}^{min}$ are the upper/lower limit on gas consumption of pipeline l in time step t $s_{l,t}^{+}, s_{l,t}^{-}$ non-negative slack variables for violation of the gas consumption of pipeline l in time step t Pipeline daily limit:

$$PDL:\ Q_l^{min} \le \sum_t Q_{l,t} - s_l^{+} + s_l^{-} \le Q_l^{max}\ \forall\ l, t$$

$$0 \le s_l^{+} \le s_l^{max}\ \forall l,\ 0 \le s_l^{-} \le s_l^{max}\ \forall l$$

Where $Q_l^{max}/Q_l^{min}$ are the upper/lower limit on gas consumption of pipeline l in a day $s_l^{+}, s_l^{-}$ non-negative slack variables for violation of the gas consumption of pipeline l in a day Area Pipeline hourly limit:

$$AHL:\ \sum_{i \in Area(l,a)} Q_{i,l,t} - s_{a,t}^{+} \le Q_{a,t}^{max}\ \forall\ a, t$$

Where Area(l,a) are the set of resources that consume gas from pipeline l in area a $Q_{a,t}^{max}$ is the upper limit on gas consumption of pipeline l in area a in time step t $s_{a,t}^{+}$ non-negative slack variables for violation of the gas consumption of pipeline l in area a in time step t Area Pipeline daily limit:

$$ADL: \sum_{t} \sum_{i \in Areae(l,a)} Q_{i,l,t} - s_a^+ \leq Q_a^{max} \ \forall \ a, t$$

$$0 \leq s_a^+ \leq s_a^{max} \ \forall \ a$$

Where $Q_a^{max}$ is the upper limit on gas consumption of pipeline l in area a in a day $s_a^{+}$ non-negative slack variables for violation of the gas consumption of pipeline l in area a in a day Plant hourly limit:

$$PLHL: \sum_{i \in Plant(p)} Q_{i,t} \leq Q_{p,t}^{max} \ \forall \ p, t$$

Where $Q_{p,t}^{max}$ is the upper limit on gas consumption of plant p in time step t Plant(p) are the set of resources that are in plant p Plant daily limit:

$$PLDL: \sum_{t} \sum_{i \in Plant(p)} Q_{i,t} \leq Q_p^{max} \ \forall \ p, t$$

Where $Q_{p,t}^{max}$ is the upper limit on gas consumption of plant p in a day

Unit hourly limit:

$$Q_{i,t} \leq Q_{i,t}^{max} \ \forall i,t$$

Where $Q_{i,t}^{max}$ is the upper limit on gas consumption of resource i in time step t Objective function:

$$\sum_{k \in Pipeline(l)} \rho_{k,t} Q_{k,t} \ \forall \ l, t$$

Where $\rho_{k,t}$ is the gas contract price for contract k in time step t

Fuel Mix Ratio Optimization

The objective of optimizing the fuel mix is to select the optimal ratio between burning different percentages of different types of fuels to minimize production cost. Assume that dual-fuel burning resources are burning gas and oil. The cost of gas is considered through the gas contracts cost as shown in the gas constraints section. The cost of oil can be added to the objective function:

Objective:

$$+\sum_{i} \rho_{i,t}^{oil}(1 - R_{i,t}) H_{i,t}^{oil}$$

Where $\rho_{i,t}^{oil}$ is oil fuel price for resource i in time step t $R_{i,t}$ is the intermediate fuel mix ratio for resource i in time step t $H_{i,t}^{oil}$ is the oil heat consumption for resource i in time step t The heat balance constraint will be:

$$H_{i,t} = R_{i,t} H_{i,t}^{gas} + (1 - R_{i,t}) H_{i,t}^{oil} \forall i,t$$

Where $H_{i,t}$ is the total heat consumption for resource i in time step t $H_{i,t}^{gas}$ is the gas heat consumption for resource i in time step t $$R_{i,t}^{actual} = R_{i,t} H_{i,t}^{gas} / [R_{i,t} H_{i,t}^{gas} + (1 - R_{i,t}) H_{i,t}^{oil}] \forall i,t$$

Where $R_{i,t}^{actual}$ is the actual fuel mix ratio for resource i in time step t $$R_{i,t}^{actual} = R_{i,t} A_i H_{i,t}^{oil} / [R_{i,t} A_i H_{i,t}^{oil} + (1 - R_{i,t}) H_{i,t}^{oil}] \forall i,t$$

$$R_{i,t}^{actual} = R_{i,t} A_i / [R_{i,t} A_i + (1 - R_{i,t})] \forall i,t$$

$$R_{i,t} = R_{i,t}^{actual} / (A_i - A_i R_{i,t}^{actual} + R_{i,t}^{actual}) \forall i,t$$

$$H_{i,t}^{oil} a_{i,t}^{oil} P_{i,t}^{2} + b_{i,t}^{oil} P_{i,t} + c_{i,t}^{oil} \forall i,t$$

Where $a_{i,t}^{oil}$, $b_{i,t}^{oil}$, $c_{i,t}^{oil}$ are the constant coefficients for oil heat rate curve $$H_{i,t}^{gas} = A_i H_{i,t}^{oil} \forall i,t$$

Where $A_i$ is the gas adjustment factor

The objective function for heat cost for a fuel mix resource is:

$$Obj = \rho_{i,t}^{gas} R_{i,t} H_{i,t}^{gas} + \rho_{i,t}^{oil}(1 - R_{i,t}) H_{i,t}^{oil} \forall i,t$$

$$Obj = \rho_{i,t}^{gas} R_{i,t} A_i H_{i,t}^{oil} + \rho_{i,t}^{oil}(1 - R_{i,t}) H_{i,t}^{oil} \forall i,t$$

$$Obj = [\rho_{i,t}^{gas} A_i R_{i,t} + \rho_{i,t}^{oil}(1 - R_{i,t})] H_{i,t}^{oil} \forall i,t$$

$$Obj = [\rho_{i,t}^{gas} A_i R_{i,t} + \rho_{i,t}^{oil}(1 - R_{i,t})](a_{i,t}^{oil} P_{i,t}^{2} + b_{i,t}^{oil} P_{i,t} + c_{i,t}^{oil}) \forall i,t$$

$$Obj = (\rho_{i,t}^{gas} A_i R_{i,t} + \rho_{i,t}^{oil} - \rho_{i,t}^{oil} R_{i,t})(a_{i,t}^{oil} P_{i,t}^{2} + b_{i,t}^{oil} P_{i,t} + c_{i,t}^{oil}) \forall i,t$$

$$Obj = \rho_{i,t}^{oil}[a_{i,t}^{oil} P_{i,t}^{2} + b_{i,t}^{oil} P_{i,t} + c_{i,t}^{oil}] + (\rho_{i,t}^{gas} A_i - \rho_{i,t}^{oil}) R_{i,t}[a_{i,t}^{oil} P_{i,t}^{2} + b_{i,t}^{oil} P_{i,t} + c_{i,t}^{oil}]$$

The first term in the objective function is the cost if the resource is burning 100% oil and the second term is the delta cost (or cost saving) due to mixture of oil and gas.

The product terms $R_{i,t}P_{i,t}^2$ and $R_{i,t}P_{i,t}$ represent a significant issue. Since the current MILP model at this stage of the process is piece-wise linearized cost curve instead of quadratic function, the first term in the objective function will be an exact formulation without any approximation. The second term (i.e., the delta cost) will be a function of the product of the mixture ratio and the piece-wise linear cost.

Based on the realization that most resources will be dispatched at one of the break points, the second term can be modeled as the product of the mixture ratio and the piece-wise linear cost at the break point. Thus, the cost calculation is an approximation with some error only for those marginal resources that would be dispatched in the middle of a linear segment. Since the number of marginal resources in a UC run is relatively very small, this approximation will have a very high accuracy. The error only lies in the marginal linear segment on the marginal resource. The product of the mixture ratio and the piece-wise linear cost causes the problem to be non-convex, so binary variables for each segment are introduced. The mixture ratio is expressed as continuous variables.

In some embodiments, the heat consumption of the last segment is approximated as the maximum or zero (0) heat consumption for that segment. This embodiment is illustrated as the first example model below. In alternative embodiments, the heat consumption of the last segment is approximated as actual consumption of heat $c_{i,j,t}\omega_{i,j,t}$ depending on where exactly the resource is located. In this case, $c_{i,j,t}$ (MBTU/MW) is the incremental heat rate for the last segment and $\omega_{i,j,t}$ is the actual dispatch size of the last segment (MW). In this alternative embodiment, illustrated as the second example model below, the fuel mix ratio for the last segment can be thought of as fixed at a certain value and this value can be predefined.

A First Example Model is provided wherein the heat consumption of the last segment is approximated as the maximum or zero (0) heat consumption for that segment:

$$HRS1: \omega_{i,j,t} \le \Delta\omega_{i,j}^{0} YR_{i,j,t} \forall i,t$$

Where $\omega_{i,j,t}$ is the dispatch size (MW) for segment j of resource i in time step t $\Delta\omega_{i,j}^{0}$ is the size limit on segment j of resource i in time step t $YR_{i,j,t}$ is the binary variable indicating whether segment j of resource i in time step t is dispatched: 1 indicates dispatched while 0 not.

$$HRS2: YR_{i,j,t} \ge YR_{i,j+1,t} \forall i,t$$

$$HRS3: \Delta H_{i,j,t} \ge \Delta H_{i,j}^{0}(R_{i,t}+YR_{i,j,t}-1) \forall i,t$$

Where $\Delta H_{i,j,t}$ is the heat rate consumption segment j of resource i in time step t $\Delta H_{i,j}^{0}$ is the upper limit on heat rate consumption segment j of resource i in time step t $$HRS4: \Delta H_{i,j,t} \le \Delta H_{i,j}^{0} R_{i,t} \forall i,t$$

$$HRS5: \Delta H_{i,j,t} \le \Delta H_{i,j}^{0} YR_{i,j,t} \forall i,t$$

$$HRS6: \omega_{i,j,t} \ge \omega_{i,j,t}^{0}(YR_{i,j,t}+YR_{i,j+1,t}-1) \forall i,t$$

Gas consumption for resource i in time t:

$$HGAS:\ Q_{i,t}^{gas} = A_i * \left(R_{i,t} * c_{i,t}^{oil} + \sum_j \Delta H_{i,j,t}\right)$$

A Second Example Model is provided wherein the heat consumption of the last segment is approximated as actual consumption of heat $c_{i,j,t}\omega_{i,j,t}$ depending on where exactly the resource is located:

$$HRS1: H_{i,j,t} \ge H_{i,j,t}^{0}(R_{i,t}+YL_{i,j,t}-1)+c_{i,j,t}\omega_{i,j,t}+c_{i,j,t}\omega_{i,j,t}^{0}(YL_{i,j,t}-1) \forall i,t$$

Where $H_{i,j,t}$ is the heat consumption of resource i in time step t if dispatched in segment j $H_{i,j,t}^{0}$ is the heat consumption of resource i in time step t if dispatched at the start point of segment j, i.e., segment j is not dispatched $YL_{i,j,t}$ is the binary variable indicating whether resource i in time step t is dispatched in segment j: 1 indicates dispatched in segment j while 0 indicates not dispatched.

$$HRS2:\ H_{i,j,t} \le H_{i,j,t}^{0} R_{i,t} + c_{i,j,t}\omega_{i,j,t} + c_{i,j,t}\omega_{i,j,t}^{0}(1 - YL_{i,j,t})\ \forall\ i,t$$

$$HRS3:\ H_{i,j,t} \le (H_{i,j,t}^{0} + c_{i,j,t}\omega_{i,j,t}^{0}) YL_{i,j,t}\ \forall\ i,t$$

$$MUEX:\ \sum_j YL_{i,j,t} = Y_{i,t}\ \forall\ i,t$$

Where $Y_{i,t}$ is the binary variable to indicate the commitment status of resource i in time step t: 1 indicates committed while 0 indicates not committed.

$$PEN5:\ P_{i,t} \le \sum_j (P_{i,j,t}^{max} YL_{i,j,t})\ \forall\ i,t$$

Where $P_{i,t}$ is the MW dispatch of resource i in time step t $P_{i,j,t}^{max}$ is the upper bound on the segment j of resource i in time step t $$PEN6:\ P_{i,t} \ge \sum_j (P_{i,j,t}^{min} YL_{i,j,t})\ \forall\ i,t$$

Where $P_{i,j,t}^{min}$ is the lower bound on the segment j of resource i in time step t Lower and upper limits on fuel mix ratio:

$$R_{i,t} = R_{i,t}^{actual}/(A_i - A_i A_{i,t}^{actual} + R_{i,t}^{actual}) \forall i,t$$

That is:

$$MIXH: R_{i,t} \le R_{i,t}^{actual,max}/(A_i - A_i R_{i,t}^{actual,max} + R_{i,t}^{actual,max}) Y_{i,t} \forall i,t$$

$$MIXL: R_{i,t} \ge R_{i,t}^{actual,min}/(A_i - A_i R_{i,t}^{actual,min} + R_{i,t}^{actual,min}) Y_{i,t} \forall i,t$$

Where $R_{i,t}^{actual,max}/R_{i,t}^{actual,min}$ is the upper/lower limit on fuel mix ratio.

Constraints in fuel changes:

Limit on number of switches from gas to oil, or oil to gas, or gas/oil to mixture:

$$MSWL:\ \sum_t GR_{i,t}^{gas\_to\_oil} \le GR_i^{max}$$

Where $GR_{i,t}^{gas\_to\_oil}$ is binary variable indicating whether resource i is switching from gas to oil in time step t $GR_i^{max}$ is the upper limit on the number of switches from gas to oil $$MSW1: GR_{i,t}^{gas\_to\_oil} \le Y_{i,t}^{gas} \forall i,t$$

Where $Y_{i,t}^{gas}$ is binary variable indicating whether resource i is burning gas in time step t $$MSW2: GR_{i,t}^{gas\_to\_oil} \le Y_{i,t+1+tr\_time}^{oil} \forall i,t$$

Where $Y_{i,t}^{oil}$ is binary variable indicating whether resource i is burning oil in time step t tr_time is the time needed to switch from gas to oil $$MSW3:\ GR_{i,t}^{gas\_to\_oil} \ge Y_{i,t}^{gas} + Y_{i,t+1+tr\_time}^{oil} - 1\ \forall\ i,t$$

$$MSW4:\ \sum_{m=t+1}^{t+tr\_time} Y_{i,t}^{gas} \ge \text{tr\_time} GR_{i,t}^{gas\_to\_oil}\ \forall\ i,t$$

The switch from oil to gas is formulated similarly.

Mutually exclusive constraint:

$$MRS1: YR_{i,t}^{Gas}+YR_{i,t}^{Oil}+YR_{i,t}^{Mix}=Y_{i,t} \forall i,t$$

Where $YR_{i,t}^{Mix}$ is binary variable indicating whether resource i is burning a mixture of oil and gas in time step t $YR_{i,t}^{Gas}$ is binary variable indicating whether resource i is burning gas in time step t $YR_{i,t}^{Oil}$ is binary variable indicating whether resource i is burning oil in time step t MW high limit to burn gas:

$$PENG(PEN2): P_{i,t} \leq P_{i,t}^{gas\_mw\_high} Y_{i,t} + (P_{i,t}^{max} - P_{i,t}^{gas\_mw\_high}) Y_{i,t}^{oil} \forall i,t$$

Where $P_{i,t}^{gas\_mw\_high}$ is the upper limit on the MW dispatch when resource i can burn gas in time step t $P_{i,t}^{max}$ is the upper limit on MW dispatch of resource i in time step t MW low limit to burn oil:

$$PENO(PEN3): P_{i,t} \leq P_{i,t}^{oil\_mw\_low} Y_{i,t} - (P_{i,t}^{oil\_mw\_low} - P_{i,t}^{min}) Y_{i,t}^{gas} \forall i,t$$

Where $P_{i,t}^{oil\_mw\_low}$ is the lower limit on the MW dispatch when resource i can burn oil in time step t $P_{i,t}^{min}$ is the lower limit on MW dispatch of resource i in time step t.

Note that the two illustrative models above demonstrate two different examples of how fuel consumption can be modeled. The primary difference between these two example models is the manner in which fuel consumption on the last segment is approximated when a resource is dispatched in the middle of that last segment. In some embodiments, the second example model may offer a better approximation. However, it should be understood that both models are merely examples of two approaches to model fuel consumption and there are other different approaches that can be employed.

Figure 2:
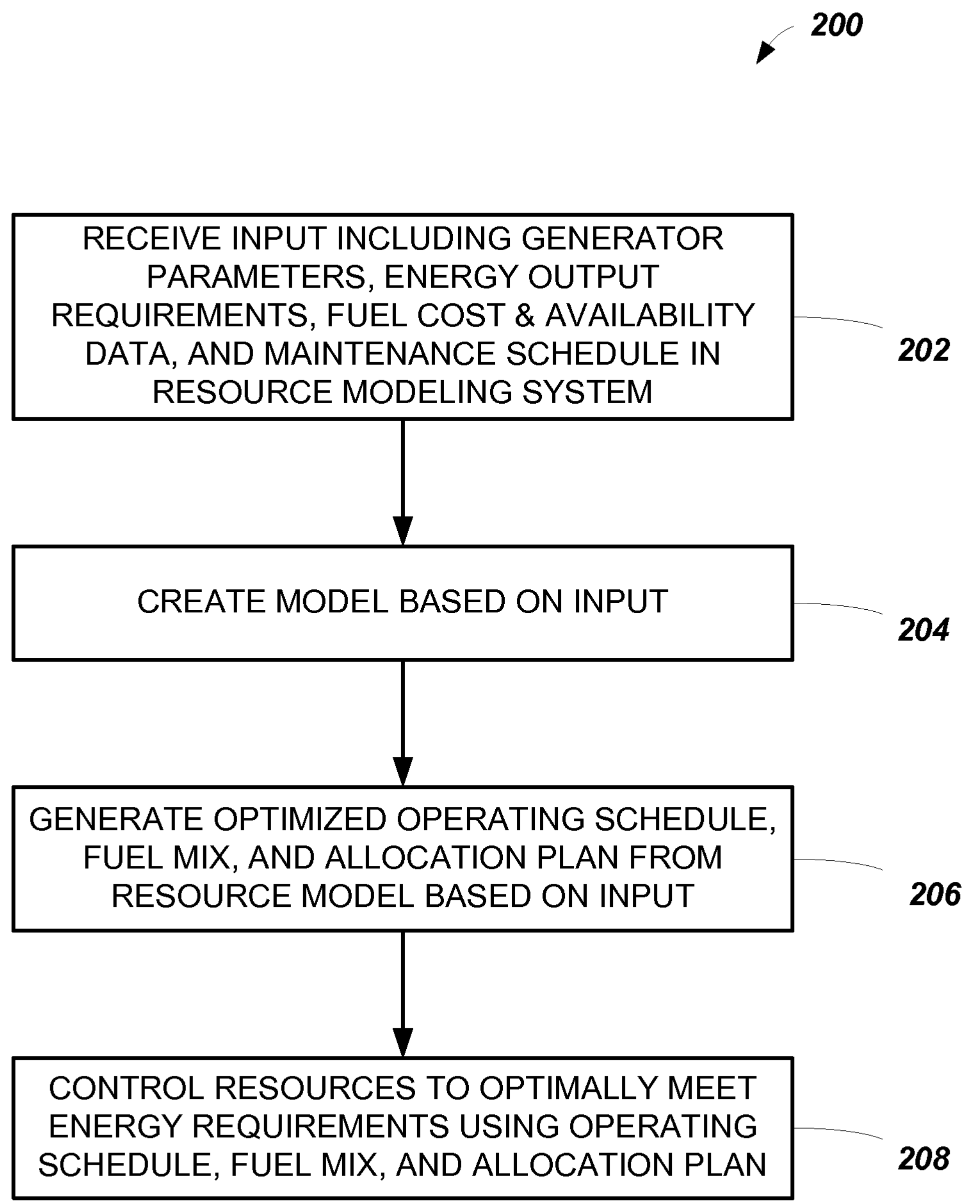
FIG. 2 is a flowchart depicting an example method according to embodiments of the present invention.

FIG. 2 depicts a flowchart illustrating an example of a method 200 according to embodiments of the present invention. Initially, input data including generator parameters, energy output requirements, fuel cost and availability data, and maintenance schedules is received in the resource modeling system (202). The resource model 111 is then created based on the input data (204). Details of the model creation are provided below with respect to the flowchart of FIG. 3. Using the resource model 111, an operating schedule, optimal fuel mix, and allocation plan are then generated (206). Finally, the resources are controlled and fueled based upon the operating schedule, fuel mix, and allocation plan to optimally meet the energy requirements of the customers (208).

The table below provides a simplified example operating schedule. The operating schedule includes an indication of commitment status. A "1" indicates the resource is committed while a "0" indicates the resource is offline. The dispatch MW, fuel mix ratio as a percentage of gas consumption to total heat consumption, and the gas allocation in terms of MCF for each resource are also indicated. In this illustrative example, assume that the system load forecast for a three hour period serviced by two generating resources (Resource 1 and Resource 2) is 500 MW, 300 MW, and 800 MW, respectively for each hour. Also assume that the two generating resources in the system include Resource 1 which is a dual fuel (e.g., gas and oil) burning unit and Resource 2 which is a single fuel (e.g., pure gas) burning unit. Depending on the heat rate curves of resources and the fuel prices, the optimal dispatch schedule, fuel mix ratio, and gas allocation is as follows:

| | 1 | | 2 | | 3 | |
|---|---|---|---|---|---|---|
| Hour | Resource 1 | Resource 2 | Resource 1 | Resource 2 | Resource 1 | Resource 2 |
| Commitment Status | 1 | 1 | 0 | 1 | 1 | 1 |
| Dispatch MW | 200 | 300 | 0 | 300 | 500 | 300 |
| Fuel Mix ratio (Gas percentage) | 100% | N/A | 0 | N/A | 80% | N/A |
| Gas consumption (MCF) | 2000 | 3000 | 0 | 3000 | 4000 | 3000 |

In the above example, dual-fuel burning Resource 1 is committed at hour 1 and 3, and scheduled to burn 100% and 85% of gas at hour 1 and 3, respectively. Resources 2, a pure gas burning unit, is committed for all the three hours and scheduled to burn 100% gas.

Figure 3:
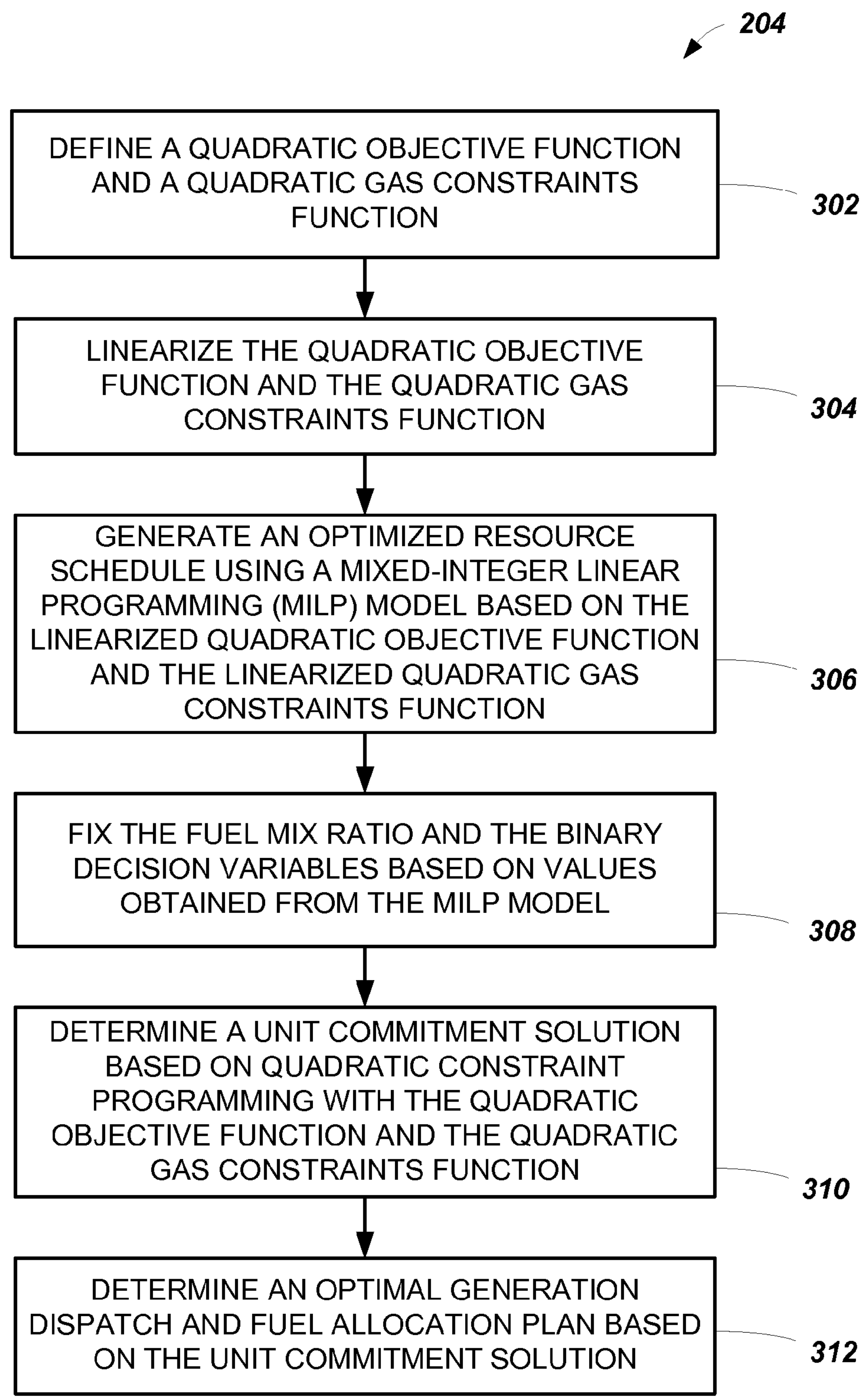
FIG. 3 is a flowchart depicting details of the example method of FIG. 2 according to embodiments of the present invention.

FIG. 3 depicts an example method 204 of creating the resource model 111 according to embodiments of the present invention. The description is a summary of the process described in detail above with respect to a specific example. Initially, a quadratic objective function and a quadratic gas constraints function are defined (302). The quadratic objective function and the quadratic gas constraints function are then linearized (304). An optimized resource schedule is generated using a mixed-integer linear programming (MILP) model based on the linearized quadratic objective function and the linearized quadratic gas constraints function (306). The fuel mix ratio and the binary decision variables are fixed based on values obtained from the MILP model (308). A unit commitment solution based on quadratic constraint programming with the quadratic objective function and the quadratic gas constraints function is next determined (310). An optimal generation dispatch and fuel allocation plan is determined based on the unit commitment solution (312).

The foregoing description discloses only exemplary embodiments of the invention. Modifications of the above disclosed apparatus and methods which fall within the scope of the invention will be readily apparent to those of ordinary skill in the art. For example, although the examples discussed above are illustrated using a fuel mix with just two fuels, embodiments of the invention can be implemented using 3, 4, 5, or more fuels. Likewise, even though the examples above are only described using oil and gas, other fuels and fuel distribution networks can be modeled and used.

Accordingly, while the present invention has been disclosed in connection with exemplary embodiments thereof, it should be understood that other embodiments may fall within the spirit and scope of the invention, as defined by the following claims.

What is claimed is:

1. A system for operating generator resources comprising:

a plurality of input information sources to provide input information including at least one of generator parameters, energy output requirements, fuel cost, fuel availability, and a maintenance schedule;

a modeling system is configured to create a resource model based on the input information wherein creating the resource model includes linearizing a quadratic objective function and linearizing a quadratic gas constraints function, the resource model operable to generate an optimized operating schedule, a fuel mix and a fuel allocation plan, the modeling system couplable to the input information sources to receive the input information;

a system controller operative to execute the operating schedule and fuel allocation plan, and coupled to the modeling system;

a plurality of multi-fuel power generators coupled to and controlled by the system controller; and a fuels supply coupled to the system controller to supply fuels to the plurality of multi-fuel power generators, wherein the system controller is configured to control the plurality of multi-fuel power generators to meet energy output requirements using the optimized operating schedule, the fuel mix, and the fuel allocation plan, and wherein the modeling system is configured to fix the fuel mix by setting a fuel mix ratio and binary decision variables based on values obtained from a mixed-integer linear programming model and based on quadratic constraint programming with a quadratic objective function without linearization and a quadratic gas constraints function without linearization.

2. The system of claim 1 wherein the resource model is based on the input information, a linearized quadratic objective function, and a linearized quadratic gas constraints function.

3. The system of claim 1 wherein the modeling system uses the mixed-integer linear programming model with a linearized quadratic objective function and a linearized quadratic gas constraints function to optimize resource scheduling.

4. The system of claim 1 wherein the fuel allocation plan is based on the quadratic constraint programming with the quadratic objective function without linearization and the quadratic gas constraints function without linearization.

5. The system of claim 1 wherein the modeling system determines a unit commitment solution based on the quadratic constraint programming with the quadratic objective function without linearization and the quadratic gas constraints function without linearization.

6. The system of claim 5 wherein the modeling system determines an optimal generation dispatch and fuel allocation plan based on the unit commitment solution.

7. The system of claim 1 wherein the fuel mix ratio is a continuous variable.

8. The system of claim 7 wherein the continuous variable is between 0 and 1.

9. The system of claim 1 wherein the modeling system is configured to receive the fuel cost and the fuel availability from a plurality of fuel suppliers.

10. The system of claim 1 wherein the modeling system i s configured to receive the generator parameters from a plurality of resource manufacturers.

11. The system of claim 1 wherein the modeling system is configured to receive the maintenance schedule from a resource maintenance.

* * * * *